Patented Aug. 12, 1941

2,251,922

UNITED STATES PATENT OFFICE 2,251,922

N - NITROARYL TETRAHYDROQUINOLINE COMPOUNDS AND MATERIAL COLORED THEREWITH

Joseph B. Dickey, Rochester, N. Y., and James B. Normington, Kingsport, Tenn., assignors to Eastman Kodak Company, Rochester, N. Y., a corporation of New Jersey No Drawing. Application August 22, 1940, Serial No. 353,676

14 Claims. (Cl. 260—283)

This invention relates to N-nitroaryl tetrahydroquinoline compounds and their application for the coloration of organic derivatives of cellulose, wool and silk.

The N-nitroaryl tetrahydroquinoline compounds of our invention can be represented by the general formula:

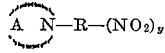

wherein A stands for the non-metallic elements necessary to complete a tetrahydroquinoline nucleus, R represents the residue of a member selected from the group consisting of a benzene nucleus and a naphthalene nucleus and $y$ represents a small whole positive number.

While our invention relates broadly to the N-nitroaryl tetrahydroquinoline compounds having the above general formula, it relates more particularly to those compounds having the general formula:

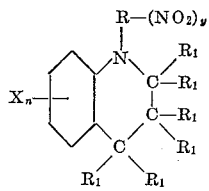

wherein each $R_1$ represents a member selected from the group consisting of hydrogen, an alkyl, an alkoxy and a hydroxy group, X represents a substituent such as a halogen atom, a hydroxy, a nitro, a cyano, an alkyl, an alkoxy, an amino, a sulfonamide, an alkylsulfone, a sulfonic acid and a carboxylic acid group, $n$ stands for a small whole positive number such as 1, 2 or 3, and wherein R and $y$ have the meaning previously assigned to them.

We have discovered that the new N-nitroaryl tetrahydroquinoline compounds of our invention constitute valuable dye compounds which, depending on their particular structure, are suitable for the coloration of organic derivatives of cellulose, wool and silk, especially textile materials made of these materials. For the coloration of organic derivatives of cellulose the dye compounds of our invention should not contain a nuclear free sulfonic acid group and preferably they should contain no nuclear free carboxylic acid groups. These compounds possess some utility for the coloration of wool and silk, but the compounds containing a sulfonic acid or carboxylic acid group are generally advantageous for the coloration of wool and silk. Coloration can be effected by dyeing, printing, stenciling or like methods. The dye compounds of our invention yield yellow, orange-yellow and orange colorations. By the reduction of the nitro groups on the compounds of our invention to amino groups compounds are obtained which are suitable for use in the preparation of photographic color films or as anti-oxidants for gasoline.

Typical organic derivatives of cellulose include the hydrolyzed as well as the unhydrolyzed cellulose organic acid esters, such as cellulose acetate, cellulose formate, cellulose propionate or cellulose butyrate, and the hydrolyzed as well as the unhydrolyzed mixed organic acid esters of cellulose, such as cellulose acetate-propionate, cellulose acetate-butyrate, and the cellulose ethers, such as methyl cellulose, ethyl cellulose or benzyl cellulose.

It is an object of our invention to provide N-nitroaryl tetrahydroquinoline compounds. Another object of our invention is to provide a process for the manufacture of the N-nitroaryl tetrahydroquinoline compounds of our invention. A further object is to provide colored textile materials of good fastness to light and washing. Other objects will hereinafter appear.

The term "alkyl" as used herein includes unsubstituted alkyl groups such as a methyl group, an ethyl group, a propyl group, or a butyl group, as well as substituted alkyl groups such as β-hydroxyethyl, β-hydroxypropyl, β,γ-dihydroxypropyl, γ-hydroxypropyl, β-methoxyethyl, β-ethoxyethyl, β-chloroethyl, β-sulfoethyl, β-sulfopropyl, γ-sulfopropyl, β-sulfatoethyl, β-sulfatopropyl, β-cyanoethyl, γ-cyanopropyl and hydroxyalkyl groups esterified to an acid ester of phosphorus such as β-phosphatoethyl, γ-phosphatopropyl, and β-phosphitoethyl. Similarly the term "alkoxy" includes, for example, methoxy, ethoxy, propoxy, butoxy, β-methoxyethoxy and β-ethoxyethoxy.

The term "a sulfonamide group" includes, for example, the sulfonamide group, phenylsulfonamide and alkylsulfonamide groups such as monomethyl-, di-methyl-, methylethyl-, diethyl-, β-hydroxyethyl- and β-methoxyethyl-sulfonamide. Illustrative acylamino groups include monoacetyl-, diacetyl-, monopropionyl-, monofuroyl-, monoformyl-, monobenzoyl- and monobutyryl-amino, for example. Further alkylsulfone includes groups such as methyl-, ethyl-, propyl- and β-hydroxyethyl-sulfone.

The N-nitroaryl tetrahydroquinoline compounds of our invention can be prepared by condensing tetrahydroquinoline compounds unsubstituted in their ring nitrogen atom with nitrochlorobenzene and nitrochloronaphthalene compounds.

The following examples illustrate the preparation of the N-nitroaryl tetrahydroquinoline compounds of our invention:

*Example 1*

1 gram mole of tetrahydroquinoline is heated at 190° C.–250° C. in an autoclave with 1 gram mole of p-nitrochlorobenzene, 1 gram mole of sodium bicarbonate and 5 grams of copper powder. The reaction mixture is heated at this temperature for about 10 hours following which it is cooled and the reaction product recovered therefrom by filtration. The reaction product is steam distilled to remove unreacted tetrahydroquinoline and p-nitrochlorobenzene. The N-p-nitrophenyl tetrahydroquinoline obtained can be purified by crystallization from ethyl alcohol. This dye compound colors cellulose acetate silk yellow.

*Example 2*

1 gram mole of 6-hydroxytetrahydroquinoline is heated for 4 hours at 100° C. in an autoclave with 1 gram mole of 2,4-dinitrochlorobenzene, 1 gram mole of sodium bicarbonate and 5 grams of copper powder. The reaction product is worked up as described in Example 1. The N-2,4-dinitrophenyl-6-hydroxytetrahydroquinoline obtained can similarly be purified by crystallization from ethyl alcohol and dyes cellulose acetate silk, wool and silk yellowish-orange shades.

*Example 3*

1 gram mole of 6-nitrotetrahydroquinoline is reacted in accordance with the general procedure described in Example 1 with 1 gram mole of 2-chloro-5-nitrobenzene sulfonic acid. The reaction product is recovered from the reaction mixture by salting out with sodium chloride. The N-2-sulfonic-4-nitrophenyl-6-nitrotetrahydroquinoline obtained colors silk and wool yellowish-orange colors from its aqueous solution.

The following tabulation further illustrates the compounds of our invention. These compounds can be prepared in accordance with the general procedure described in the foregoing examples from the components set forth.

Dye (4)

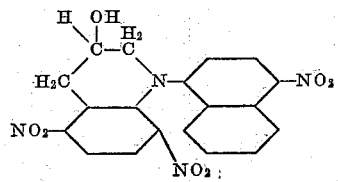

Component 1-chloro-4-nitronaphthalene and 3-hydroxy-5,8-dinitrotetrahydroquinoline Colors cellulose acetate, wool and silk orange.

Dye (5)

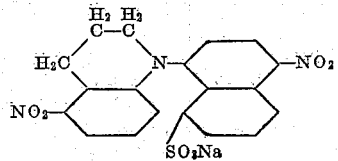

Component 1-chloro-4-nitro-8-sulfonic-naphthalene and 5-nitrotetrahydroquinoline.

Colors wool and silk yellow.

Dye (6)

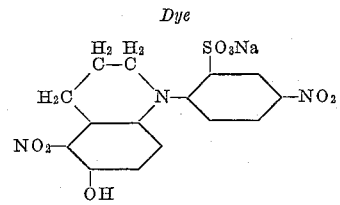

Component 5-nitro-6-hydroxytetrahydroquinoline and 1-chloro-2-sulfonic-4-nitrobenzene.

Colors wool and silk orange-yellow.

Dye (7)

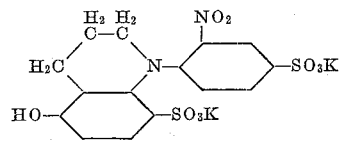

Component 5-hydroxy-8-sulfonictetrahydroquinoline and 1-chloro-2-nitro-4-sulfonic benzene.

Colors wool and silk orange-yellow.

Dye (8)

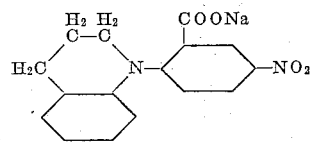

Component

Tetrahydroquinoline and 1-chloro-2-carboxy-4-nitrobenzene.

Colors cellulose acetate, wool and silk yellow.

Dye (9)

Component 5-(OC$_2$H$_4$OC$_2$H$_4$OH)-8-nitro tetrahydroquinoline and 1-chloro-2,4-dinitro-6-carboxybenzene Colors cellulose acetate, wool and silk orange.

Dye (10)

Component 6-aminotetrahydroquinoline and 1-chloro-2-hydroxy-4-nitrobenzene

Colors cellulose acetate, wool and silk orange.

Dye (11)

Component 6-methyltetrahydroquinoline and 1-chloro-2,6-dinitro-4-hydroxybenzene

Colors cellulose acetate, silk and wool orange.

It is to be clearly understood that the examples given are intended to be illustrative and not limitative of our invention as numerous other tetrahydroquinoline compounds can be employed instead of those specifically shown. Similarly other nitrochlorobenzene and nitrochloronaphthalene compounds can be employed in place of those specifically shown. Other tetrahydroquinoline compounds that can be used include 7-methyl tetrahydroquinoline, 5-methyl tetrahydroquinoline, 7-methoxy tetrahydroquinoline, 2,2,4-trimethyl-8-chlorotetrahydroquinoline, 5-acetylamino tetrahydroquinoline, 8-methoxy tetrahydroquinoline, 7-chlorotetrahydroquinoline and 5,8-dimethoxytetrahydroquinoline. Any of the tetrahydroquinoline compounds just named can be condensed with any of the nitrochloro-benzene and naphthalene compounds previously mentioned or disclosed hereinafter.

Other nitrochloro-benzene and naphthalene compounds that can be employed include 1,4-dichloro-2-nitrobenzene, 1-chloro-2,6-dinitrobenzene, 1-chloro-2-nitro-4-methoxybenzene, 1-chloro-4-sulfonic-2,6-dinitrobenzene, 1-chloro-2-nitro-4-cyanobenzene, 1-chloro-2-methoxy-4-nitronaphthalene, 1-chloro-2,4-dinitronaphthalene, 1-chloro-2-hydroxy-4-nitronaphthalene, 1-chloro-3-carboxy-4-nitronaphthalene, 1-chloro-4-nitro-8-carboxynaphthalene and 1-chloro-4-nitro-8-cyanonaphthalene. Any of the nitrochlorobenzene and naphthalene compounds just named can be condensed with any of the tetrahydroquinoline compounds disclosed herein to give dye compounds of our invention.

The tetrahydroquinoline compounds employed in the preparation of the dye compounds of our invention can be prepared by hydrogenating quinoline or suitable quinoline derivatives in the presence of a catalyst such as Raney nickel. Substituted anilines can be prepared from the corresponding substituted aniline compounds using the Skraup synthesis. 7-methylquinoline, for example, can be prepared from m-toluidine using this method. Tetrahydroquinolines substituted in the portion of the nucleus containing the nitrogen atom can be prepared by reacting aniline or substituted anilines using a ketone such as acetone, methylethyl ketone, diethylketone, etc., together with a suitable catalyst or catalysts as described in Berichte der Deutschen Chemischen Gesellschaft, vol. 54, page 1723 (1921), or vol. 65, page 1511 (1932), or Journal American Chemical Society, vol. 55, page 2805 (1933), and hydrogenating the substituted quinolines thus formed. Substituents such as those shown herein can be introduced into the benzene nucleus of the tetrahydroquinoline compound by methods known for the introduction of such substituents into a benzene nucleus.

The dye compounds of our invention can be applied for the coloration of organic derivatives of cellulose, wool and silk by known methods for coloring these materials. The dye compounds of our invention are, for the most part, relatively insoluble in water. Those compounds which are insoluble in water may be advantageously employed for the direct dyeing of textile materials by grinding the dye to a fine powder, intimately mixing it with a suitable dispersing or solubilizing agent and adding the resulting mixture to water or a dilute solution of soap in water to form an aqueous dyebath. Following this known preparation of the dyebath, the textile material or materials to be dyed may be added thereto and the dyeing operation conducted in the usual fashion. The dyeing operation can be conducted at temperatures of 70–85° C., for example.

The dye compounds of our invention which are water soluble do not, of course, require the use of a dispersing or solubilizing agent but may be applied to silk, wool and (depending upon the nature and position of the water solubilizing group) organic derivative of cellulose textile materials from an aqueous solution of the dye which may contain sodium chloride. The dye compounds of our invention may be employed in dyeing or coloring operations in accordance with the general method described in McNally and Dickey U. S. Letters Patent No. 2,115,030, issued April 26, 1938. The water soluble dyes of our invention may be employed for the coloration of textile materials made of or containing an organic derivative of cellulose, silk and wool or mixtures of these in accordance with the general procedure described in McNally and Dickey U. S. Letters Patent No. 2,107,898, issued February 8, 1938.

We claim:

1. N-nitroaryl tetrahydroquinoline compounds wherein aryl represents a member selected from the group consisting of a benzene nucleus and a naphthalene nucleus.

2. N-nitrobenzene tetrahydroquinoline compounds.

3. N-nitronaphthalene tetrahydroquinoline compounds.

4. N-nitroaryl tetrahydroquinoline compounds having the general formula:

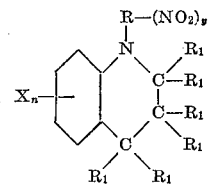

wherein each $R_1$ represents a member selected from the group consisting of hydrogen, an alkyl, an alkoxy, and a hydroxy group, X represents a member selected from the group consisting of a halogen atom, a hydroxy, a nitro, a cyano, an alkyl, an alkoxy, an amino, a sulfonamide, an alkylsulfone, a sulfonic acid and a carboxylic acid group, $n$ stands for a small whole positive number, R represents the residue of a member selected from the group consisting of a benzene nucleus and a naphthalene nucleus and $y$ represents a small whole positive number.

5. N-nitrobenzene tetrahydroquinoline compounds having the general formula:

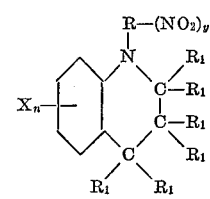

wherein each $R_1$ represents a member selected from the group consisting of hydrogen, an alkyl, an alkoxy, and a hydroxy group, X represents a member selected from the group consisting of a halogen atom, a hydroxy, a nitro, a cyano, an alkyl, an alkoxy, an amino, a sulfonamide, an alkylsulfone, a sulfonic acid and a carboxylic acid group, $n$ stands for a small whole positive number, R represents a benzene nucleus and $y$ represents a small whole positive number.

6. N-nitroaryl tetrahydroquinoline compounds having the general formula:

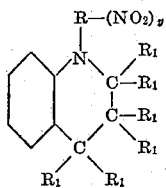

wherein R represents the residue of a member selected from the group consisting of a benzene nucleus and a naphthalene nucleus, each $R_1$ represents a member selected from the group consisting of hydrogen, an alkyl, an alkoxy and a hydroxy group and $y$ represents a small whole positive number.

7. N-nitrobenzene tetrahydroquinoline compounds having the general formula:

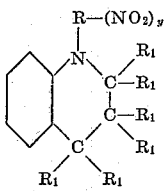

wherein R represents a benzene nucleus, each $R_1$ represents a member selected from the group consisting of hydrogen, an alkyl, an alkoxy and a hydroxy group and $y$ represents a small whole positive number.

8. The N-nitrobenzene tetrahydroquinoline dye compound having the formula:

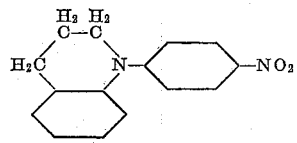

9. The N-nitrobenzene tetrahydroquinoline dye compound having the formula:

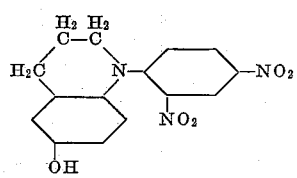

10. Textile material colored with a N-nitroaryl tetrahydroquinoline compound wherein aryl represents a member selected from the group consisting of a benzene nucleus and a naphthalene nucleus.

11. Textile material colored with a N-nitroaryl tetrahydroquinoline compound having the general formula:

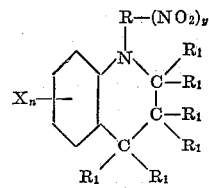

wherein each $R_1$ represents a member selected from the group consisting of hydrogen, an alkyl, an alkoxy, and a hydroxy group, X represents a member selected from the group consisting of a halogen atom, a hydroxy, a nitro, a cyano, an alkyl, an alkoxy, an amino, a sulfonamide, an alkylsulfone, a sulfonic acid and a carboxylic acid group, $n$ stands for a small whole positive number, R represents the residue of a member selected from the group consisting of a benzene nucleus and a naphthalene nucleus and $y$ represents a small whole positive number.

12. Cellulose acetate colored with a nuclear non-sulfonated N-nitroaryl tetrahydroquinoline compound wherein aryl represents a member selected from the group consisting of a benzene nucleus and a naphthalene nucleus.

13. A cellulose acetate colored with a nuclear non-sulfonated N-nitrobenzene tetrahydroquinoline compound.

14. A cellulose acetate colored with a nuclear non-sulfonated N-nitroaryl tetrahydroquinoline compound having the general formula:

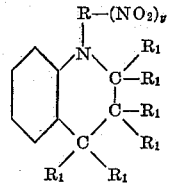

wherein R represents the residue of a member selected from the group consisting of a benzene nucleus and a naphthalene nucleus, each $R_1$ represents a member selected from the group consisting of hydrogen, an alkyl, an alkoxy and a hydroxy group and $y$ represents a small whole positive number.

JOSEPH B. DICKEY.
JAMES B. NORMINGTON.